United States Patent [19]

Bergling

[11] 4,343,055

[45] Aug. 10, 1982

[54] ROLLER SUSPENSION

[75] Inventor: Gunnar Bergling, Partille, Sweden

[73] Assignee: Aktiebolaget SKF, Goteborg, Sweden

[21] Appl. No.: 105,029

[22] Filed: Dec. 19, 1979

[30] Foreign Application Priority Data

Jan. 18, 1979 [SE] Sweden .................................. 7900442

[51] Int. Cl.³ .............................................. B63B 21/52
[52] U.S. Cl. .......................................... 441/3; 114/264;
308/207 R; 308/174
[58] Field of Search ................ 114/264, 265, 181, 220,
114/258; 9/8 P; 308/174, 175, 176, 203, 207 R,
214, 222, 226, 231, 232, 234; 267/161, 162;
193/35 R, 35 B; 104/35, 44, 46; 212/253

[56] References Cited

U.S. PATENT DOCUMENTS

| 798,350 | 8/1905 | Lake et al. | 308/226 |
| 2,123,754 | 7/1938 | Talbot | 308/176 |
| 2,337,511 | 12/1943 | Wahlmark | 308/174 |
| 3,191,201 | 6/1965 | Richardson et al. | 114/264 X |
| 3,317,252 | 5/1967 | Gassman | 267/162 |
| 3,791,499 | 2/1974 | Ryan | 267/162 |

FOREIGN PATENT DOCUMENTS

| 313828 | 8/1919 | Fed. Rep. of Germany | 104/35 |
| 1160881 | 8/1958 | France | 212/253 |
| 786621 | 11/1957 | United Kingdom | 212/253 |

Primary Examiner—Edward R. Kazenske
Assistant Examiner—Stephen P. Avila
Attorney, Agent, or Firm—Eugene E. Renz, Jr.

[57] ABSTRACT

The invention refers to a device for supporting a first member which is rotatable about a mainly vertical axis on a second member. The invention is primarily intended to be used for supporting very large members, which carry very heavy loads. The device incorporates two race tracks and a plurality of rollers cooperating therewith. In order to avoid sliding movements in the contact between roller and race track at varying loads and for achieving an even load distribution on all rollers, the rollers at least of one of the rows of rollers are resiliently suspended in support members, which are adjusted thus that the rollers will engage their associated race track under preload. The rollers and/or the race tracks may be cambered or the support members may be displaceable in the longitudinal direction of the rollers and contact the adjacent elements via arc-formed supporting surfaces for achieving a pure rolling movement in the contact between roller and race track due to race track movements.

10 Claims, 7 Drawing Figures

ROLLER SUSPENSION

BACKGROUND AND SUMMARY OF THE INVENTION

The invention is primarily intended for suspension of rollers in bearings for big and heavy objects and for transferring large forces. More specifically the present invention relates to a support bearing assembly for supporting a first member, such as the hull of a ship, for rotation about a mainly vertical axis relative to a second member, such as an anchoring member through which a drilling rig extends. The anchoring member is anchored in a desired position in the bottom of the sea by means of a plurality of anchoring lines. The support bearing permits adjustment of the ship's hull relative to the anchoring member and position the hull optimally relative to external forces such as currents, waves, or drifting ice.

Devices of this type are generally subjected to heavy static loads, and the relative movements occuring in the bearing are comparatively slow and of short duration. As the size and direction of the load varies, a sliding movement in the contact between roller and race track will easily result, and this will cause a swift wear of the bearing device. Due to inevitable manufacturing and assembly tolerances and due to material deformation caused by the load, problems will also occur in obtaining an even distribution of the load on all rollers. A further problem is to avoid local overloads at excentric and uneven load on one of the members. With a device in accordance with the present invention sliding movements are avoided, a desired even load distribution is achieved and overloading of separate rollers is avoided also in a heavily loaded device of very large dimensions.

The bearing will also be free from play at normal operation.

This is according to the invention obtained thereby that the supporting device is given the features defined in the accompanying claim 1.

The invention can preferably be used for supporting a cylindrical anchoring member for an oil drilling ship located in the ship's hull, whereby the hull will be rotatable about the anchoring member, which when drilling is performed will be attached to the sea bottom. The drill is thereby preferably arranged through the anchoring member, and the ship's hull can without the necessity of being reanchored be adjusted in a desired position with respect to e.g. currents, waves or drifting ice.

BRIEF DESCRIPTION OF THE DRAWINGS

The invention will hereinafter be further described with reference to an embodiment of such an application shown in the accompanying drawings.

DESCRIPTION OF THE PREFERRED EMBODIMENTS

Figure 1:
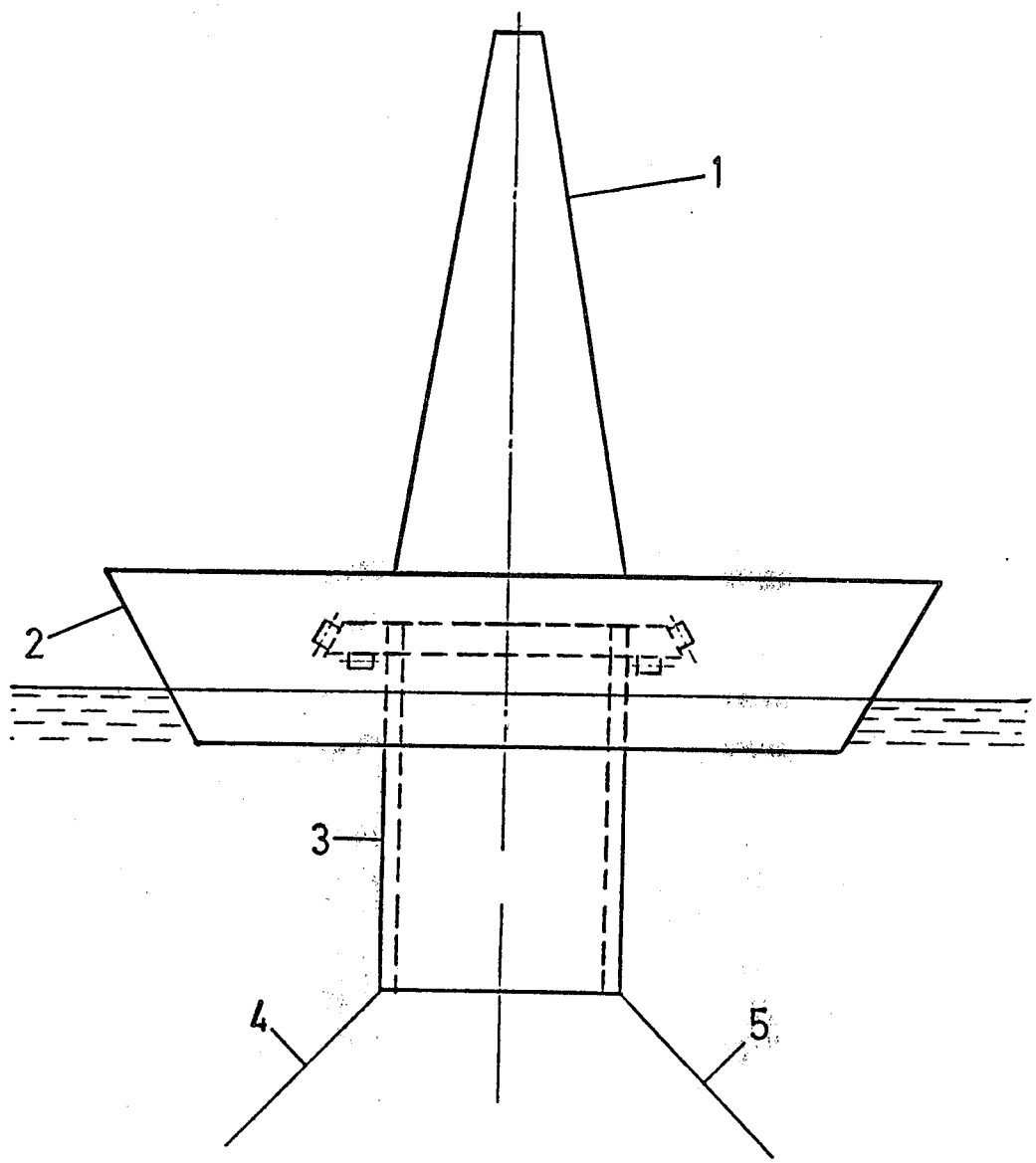
FIG. 1 shows the principle of the ship and its anchoring member.

FIG. 1 shows in an explanatory view how an oil drilling rig 1 is arranged on a ship, the hull of which being designated 2. The drill extends vertically through the ship and through a cylindrical, tubular member 3 which is rotatably supported in the ship in a supporting device, which will be further described hereinafter. The member 3 is, during drilling, anchored in a manner known per se in a desired position to the sea bottom by means of a number of anchoring lines 4, 5, preferably at least three, and not shown anchors. The member 3 can have a diameter of 50 meters and a depth of 30 meters, and the anchoring forces can amount to 20000 tons vertically and horizontally. The ship is in a conventional manner brought to the desired position where it is anchored by means of the anchoring members 3, 4, 5. As the ship's hull 2 is rotatable relative to these members it is always possible to turn the ship's stern against occuring wind, waves, currents and/or drifting ice, whereby the anchoring forces will be kept at a minimum and the position of the drilling rig will be stabilized. The rotation can e.g. be effected by aid of bow propellers arranged in the ship.

Figure 2:
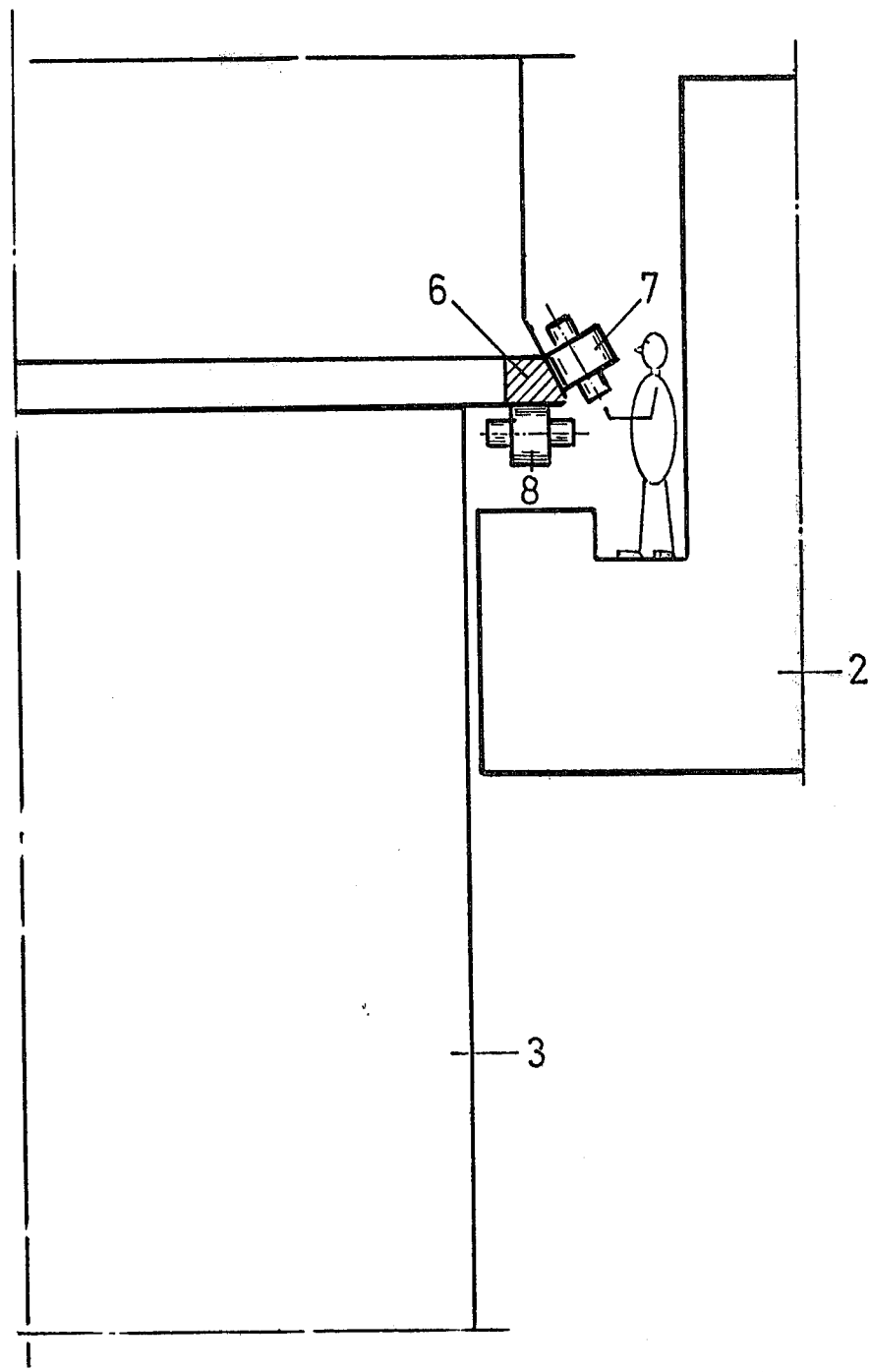
FIG. 2 is a part of the bearing device having a race ring and two rollers together with portions of the surrounding elements in larger scale.

The hull 2 is supported on the anchoring member 3 in the manner shown in FIG. 2. The hull 2 encloses the cylindrical member 3, which is provided with a ring 6 having two race tracks intended to cooperate with two rows of rollers 7, 8 one roller of each row being shown in the figure. Each row of rollers encloses the ring 6. Each roller is, as further described in connection to FIG. 3, supported in two bearings, which in turn are arranged in retainers with bearing housings, which are carried by supporting members provided in the hull 2. The last mentioned members are for the sake of clarity not shown in FIG. 2. Just the positions of the rollers are disclosed. As can be seen the axes of the rollers of one row of rollers will form an angle to the axes of the rollers of the other row of rollers. The ring 6 thereby can be squeezed between the rows of rollers whereby its position will be fixed.

Figure 3:
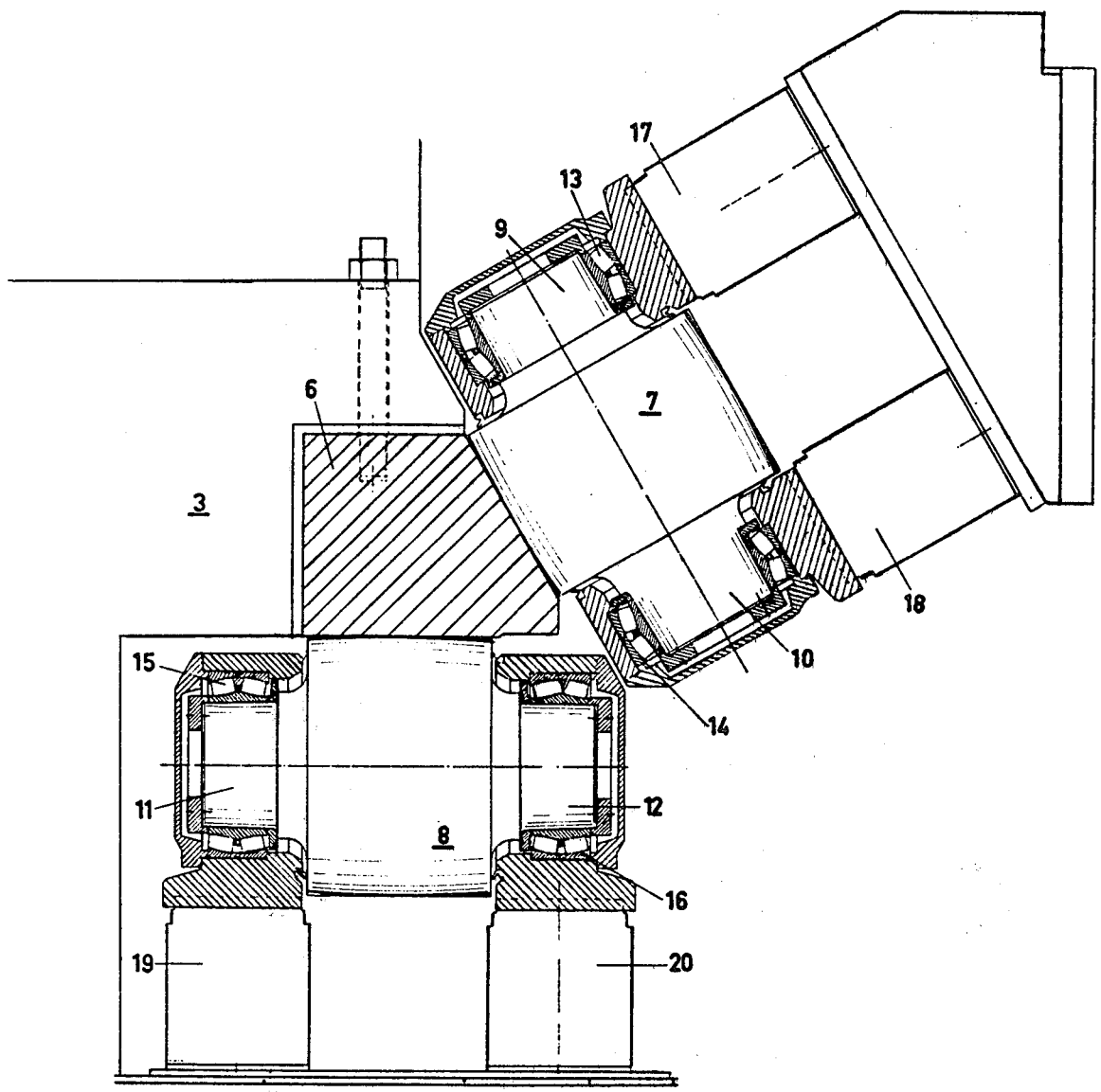
FIG. 3 shows the supporting of the rollers in still larger scale.

In FIG. 3 is shown how the rollers are suspended. Each roller end is provided with a shaft journal 9, 10, 11, 12 on which a rolling bearing 13, 14, 15, 16 is fitted. The bearings are located in retainers, which are carried on support members 17, 18, 19, 20. The supporting members for the rollers in one of the rows of rollers are resilient and adjusted thus that the rollers under spring pressure will contact the cooperating race track. The supporting members for the rollers of the other roller row can be of the same type, but they are preferably arranged in such a manner, that a predetermined force has to be exerted before the members are resiliently displaceable. This is for instance obtained if the springs are urged against a stop and are subjected to a load in a direction opposite to the spring force acting against the stop. With such an arrangement it is achieved that the ring 6 can be more rigidly tightened between the rows of rollers whereby the position of the anchoring member 3 is altered only slightly relatively to the hull 2 at moderate loads. It is at the same time guaranteed that overload on separate rollers will be avoided at heavy loads. The rollers 8 are preferably preloaded to contact the ring 6 thus that this, when no outer forces act upon the anchoring member 3, will be urged against the rollers 7 with a force corresponding to the biasing force of the springs in the supporting members 17, 18. At further load on the rollers 7 the springs in the members 17, 18 are thus deformed. When the anchoring member 3 is subjected to forces from the anchoring means it is subjected to a tilting moment acting in a vertical plane, which means that some rollers are relieved from load whereas other rollers are subjected to an increased load. Due to the fact that the supporting members for the bearing housings of the bearings 13–16 are resilient, there will be no overload of the rollers, and due to the fact that the springs are preloaded the position of the anchoring member 3 relative to the hull 2 is altered only insignificantly.

Figure 4:
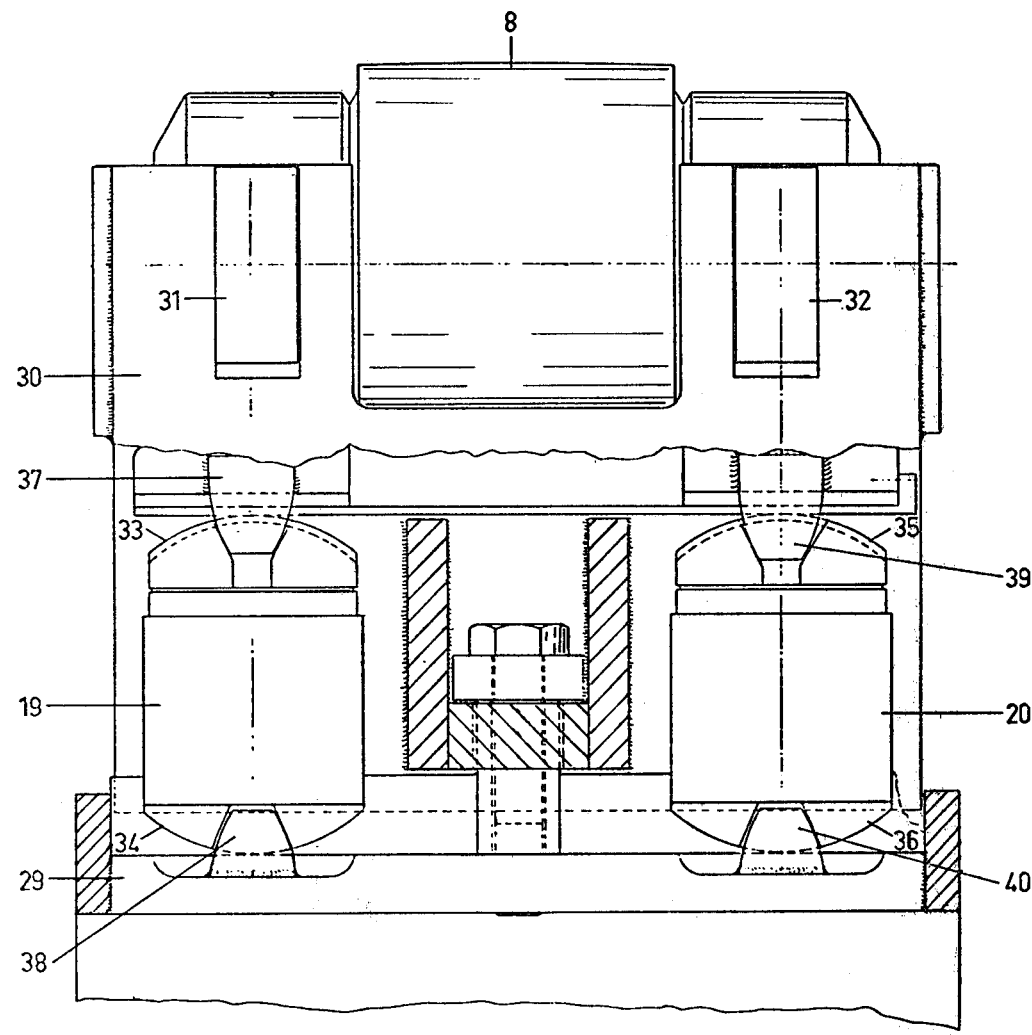
FIG. 4 shown in an axial view partly in section a roller and its supporting device.

In FIG. 4 is shown how the rollers are suspended in a preferable embodiment of the invention. The rollers 8 and its retainers are supported by two support members 19, 20 provided between the retainers and a base 29. The roller is radially movable in a frame structure 30 wherein it is guided by guiding means 31, 32. The roller is also displaceable axially relative to the base as the frame structure is displaceably arranged on the base and the support members 19, 20 have arc-formed cylindrical supporting surfaces 33, 34, 35, 36 which engage the opposed surfaces on the retainers and on the base, whereby the supporting member can tilt, resulting in that the cylindrical supporting surfaces will roll against their respective associated bases without sliding. The supporting members are guided and kept in position by means of pins 37, 38, 39, 40 arranged in the retainers and on the base, which pins enter in corresponding grooves at the ends of the cylindrical supporting ring surfaces. As the supporting members are elastically compressible, the distance between the cylindrical supporting surfaces of each supporting member is to a certain extent depending on the load carried by the supporting member. At normal load the arcs which define the two surfaces on the supporting members preferably have a common centre.

As the length of the supporting members vary only insignificantly at varying loads and their tilting angle always is comparatively small it is possible to disregard the influence of the longitudinal variations on the axial displaceability of the roller.

Changes in the position of the race track carried by the roller in relation to the base can be allowed due to the mobility of the roller relative to the base without the risk that sliding will occur in the rolling contact, as due to the friction in the contact surface between roller and race track, the roller will accompany the race track in its movements.

Figure 5:
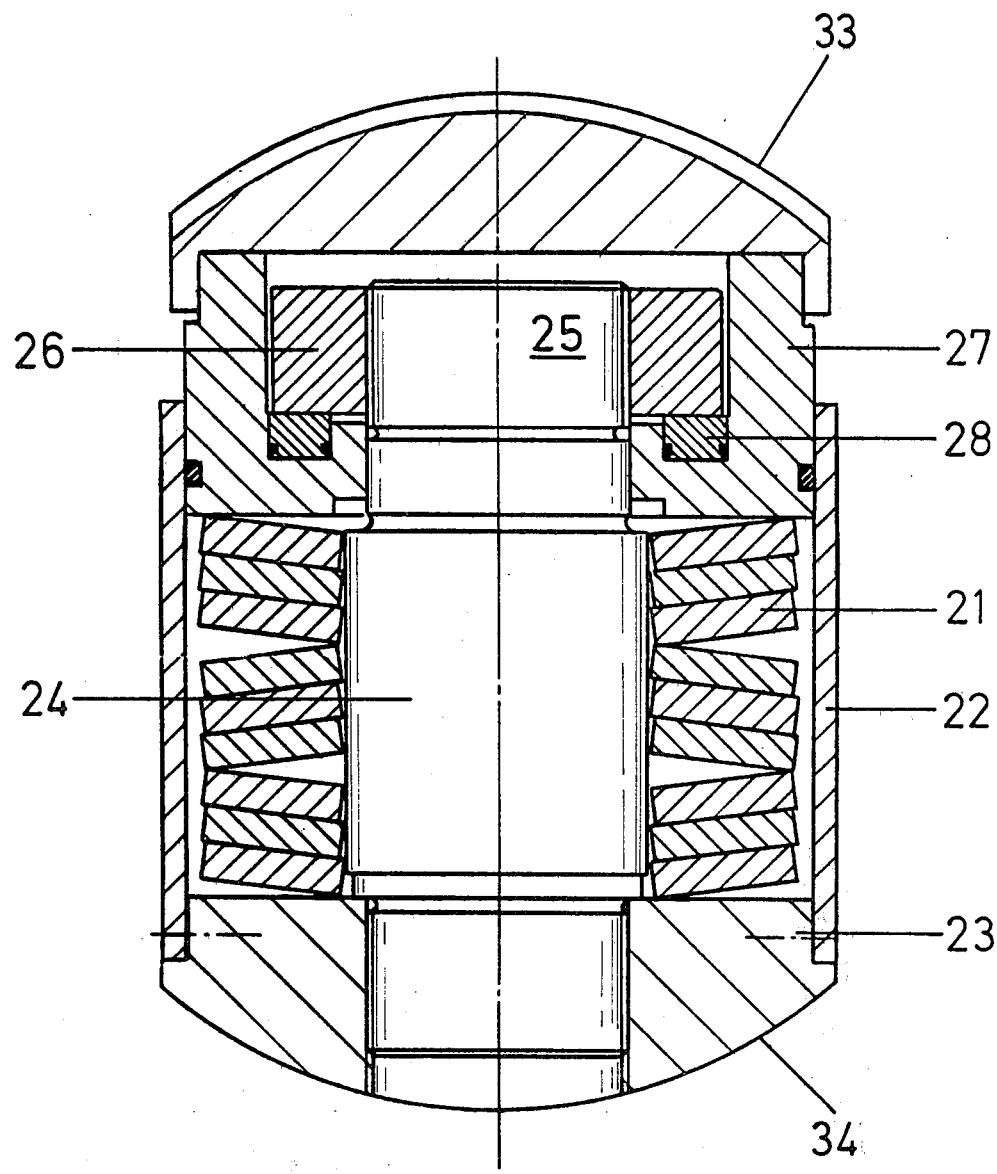
FIG. 5 shows an embodiment of a resilient supporting member for carrying a retainer for a roller.

An embodiment of a resilient support member is shown in FIG. 5. A pack of cup springs 21 is provided in a sleeve 22 having a bottom 23 and a central journal 24 with a threaded portion 25 on which a nut 26 is arranged. The pack of springs is clamped between the bottom 23 and a supporting ring 27, which in turn can engage the nut 26. By rotating the nut 26 it is possible to tighten the pack of springs to a desired preload. A bearing housing which is not shown rests against a cylindrical surface 33 at the outer end surface of the supporting ring 27. The position of this cylindrical surface is thus fixed as long as the load is lower than the preload of the spring pack. If this force shall be transferred to the bearing housing it is possible to provide the supporting member with a hydraulic biasing device formed as an annular piston 28 arranged in an annular groove in the supporting ring 27 and acting against the nut 26. By pressing in a pressure medium through not shown channels arranged between the piston and the bottom of the annular groove it is achieved that the supporting ring 27 is displaced to preload the spring pack. The supporting member can be introduced without play in this condition between a bearing housing and a foundation, whereupon the pressure on the pressure medium is relieved whereupon the spring force will act upon the bearing housing, relieving the nut 26.

Figure 7:
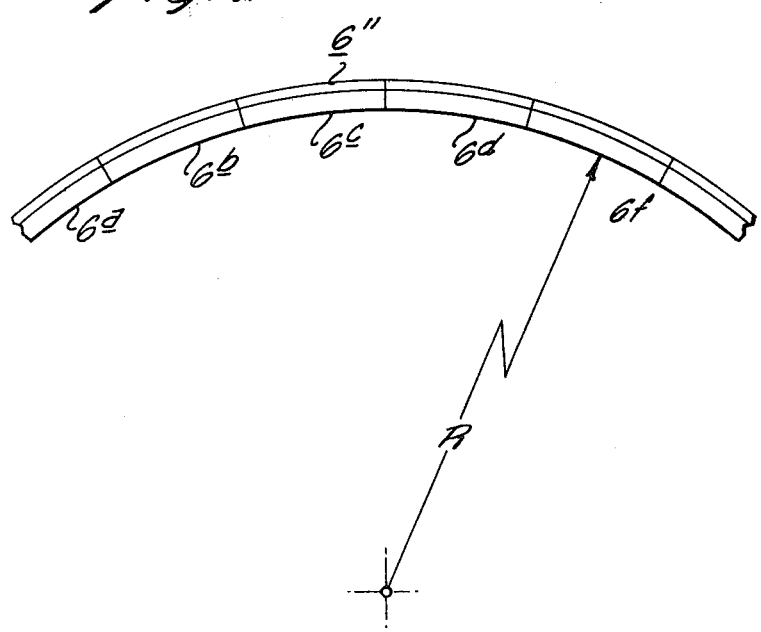
FIG. 7 is a fragmentary view showing a race track comprised of a plurality of race ring segments.

Other embodiments of the invention than that described are of course possible. The ring 6" may for instance be divided in a plurality of segments 6a–6t as illustrated in FIG. 7. The race tracks may be arranged directly on the anchoring member 3. It is also possible that the race tracks are arranged in the hull and that the rollers are arranged around the anchoring member 3. The rollers may also be rotatably supported on non-rotatable shafts, the ends of which being mounted in retainers. The supporting member can, instead of being resilient, be rigid and it can contact a base which is resilient in a manner corresponding to the earlier described supporting members, e.g. spring suspended plates on the retainers and/or the base.

The invention can also be used in other applications than that described hereabove.

Figure 6:
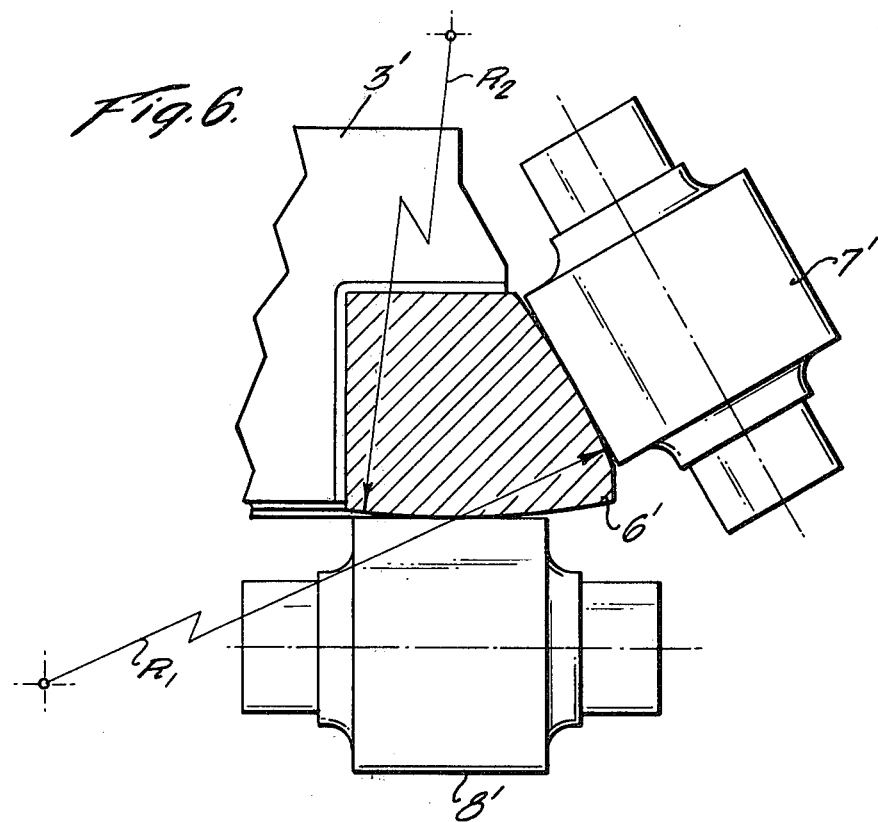
FIG. 6 is a fragmentary sectional view showing a modified form of race track having arcuate raceways.

In another possible embodiment of the invention the roller surfaces and/or the race track surfaces are cambered, i.e. they have arc-shaped profiles 6' as illustrated in FIG. 6. This means that the rollers can make a tilting movement in the tracks without sliding if the race tracks are displaced, due to the resiliency of the support members 17, 18, 19, 20. In this case, the support members may be rigidly fixed to the respective base and retainer, and they do not have to be tiltable over arc-formed supporting surfaces.

The arc-shaped surfaces may be arranged on the retainers and on the base instead of or complementary to the surfaces 33–36 on the supporting members.

I claim:

1. An assembly supporting one member (2) rotatable about a mainly vertical axis on another member (3) and adapted to transfer forces parallel to and/or perpendicular to the vertical axis of rotation comprising a pair of annular race tracks arranged on said other member and a plurality of rollers journalled in bearings at opposite axial ends on said one member, said rollers disposed in two rows, the rollers of one row engaging one of said race tracks and the rollers of said other row engaging said other race track, the axes of the rollers of said one row forming an acute angle to the axes of the rollers of said other row in a plane parallel to said vertical axis of rotation, the bearings for the rollers being mounted in separate retainers arranged on both axial ends of each roller, the retainers for at least one of the rows of rollers being resiliently carried by support members including adjustable resilient means so that the rollers of both rows engage their respective associated race track under preload.

2. An assembly as claimed in claim 1 wherein said retainers and rollers are displaceable in the longitudinal direction of the rollers and said support members have arcuate support surfaces which contact said retainers and a base on said one member.

3. An assembly as claimed in claim 1 wherein said rollers are race tracks are of a configuration defining an arc-shaped contact zone therebetween to provide a pure rolling motion in the contact zone between the rollers and race tracks when the rollers are tilted due to motions of the race tracks.

4. An assembly as claimed in claim 3 wherein said race tracks have arcuate contact surfaces.

5. An assembly as claimed in claim 3 wherein said rollers have arc-shaped contact surfaces.

6. An assembly as claimed in claim 1 wherein said supports for the rollers in one of the rows of rollers are carried by supporting members which are resiliently flexible only after the load has exceeded a predetermined value.

7. An assembly as claimed in claim 6 wherein said resilient members for carrying the rollers of said one row of rollers includes spring elements engageable with an element (27) moveable in the direction of the spring force and which carries said bearings, said element (27) being displaceable against the pressure of the spring and adjustable against an adjustable member (26) for adjusting the preload or spring force of said spring elements.

8. An assembly as claimed in claim 7 including hydraulic piston and cylinder actuators (28) cooperating with said element (27) for compressing and adjusting said spring elements.

9. An assembly as claimed in claim 1 wherein said one member is an object floating in the sea and said other member is a cylindrical anchoring member supported in said floating object and arrestable relative to the sea bottom.

10. An assembly as claimed in claim 1 wherein said race tracks comprise an annular member consisting of a plurality of segments.

* * * * *